(12) United States Patent
Van Oostrum et al.

(10) Patent No.: US 12,326,392 B2
(45) Date of Patent: Jun. 10, 2025

(54) METHOD FOR DETERMINING A PROPERTY OF A PARTICLE IN A MEDIUM

(71) Applicant: Universität für Bodenkultur Wien, Vienna (AT)

(72) Inventors: Petrus Dominicus Joannes Van Oostrum, Vienna (AT); Erik Olof Reimhult, Vienna (AT)

(73) Assignee: Universität für Bodenkultur Wien, Vienna (AT)

( * ) Notice: Subject to any disclaimer, the term of this patent is extended or adjusted under 35 U.S.C. 154(b) by 144 days.

(21) Appl. No.: 17/925,508

(22) PCT Filed: Apr. 29, 2021

(86) PCT No.: PCT/EP2021/061320
§ 371 (c)(1),
(2) Date: Nov. 15, 2022

(87) PCT Pub. No.: WO2021/249692
PCT Pub. Date: Dec. 16, 2021

(65) Prior Publication Data
US 2023/0184664 A1 Jun. 15, 2023

(30) Foreign Application Priority Data
Jun. 8, 2020 (EP) .................................. 20178798

(51) Int. Cl.
*G01N 15/1434* (2024.01)
*G01N 15/0205* (2024.01)

(52) U.S. Cl.
CPC ..... *G01N 15/1434* (2013.01); *G01N 15/0211* (2013.01)

(58) Field of Classification Search
None
See application file for complete search history.

(56) References Cited

U.S. PATENT DOCUMENTS

| 8,848,199 B2 * | 9/2014 | Choi | ...................... G01N 21/45 |
| | | | 356/497 |
| 2013/0148182 A1 * | 6/2013 | Yu | ....................... G03H 1/0443 |
| | | | 359/22 |

(Continued)

FOREIGN PATENT DOCUMENTS

WO 2019228763 A1 12/2019

OTHER PUBLICATIONS

Flewellen, James L., Irwin M. Zaid, and Richard M. Berry. "A multi-mode digital holographic microscope." Review of Scientific Instruments 90.2 (2019). (Year: 2019).*

(Continued)

*Primary Examiner* — Rufus L Phillips
(74) *Attorney, Agent, or Firm* — Hoffmann & Baron, LLP

(57) ABSTRACT

A method for determining a property of at least one particle in a medium, wherein the method comprises: emitting a coherent light beam to irradiate a sample of the medium; recording an interference image of a first part of the light beam scattered by the at least one particle and a second part of the light beam not scattered by particles; computing, for positions within the sample, an electric field of the first part from the interference image; generating a representation comprising for each position, a phase value determined from the computed electric field and from an estimated electric field of the second part, and an intensity value determined from the intensity of the first part and from the phase value; and determining said property using the representation.

20 Claims, 3 Drawing Sheets

(56) References Cited

U.S. PATENT DOCUMENTS

| | | | | |
|---|---|---|---|---|
| 2013/0342665 | A1* | 12/2013 | Wang | H04N 5/30 |
| | | | | 348/61 |
| 2015/0077819 | A1* | 3/2015 | Schnell | G03H 1/08 |
| | | | | 359/9 |
| 2017/0363532 | A1* | 12/2017 | Han | G01N 21/4795 |
| 2018/0038781 | A1* | 2/2018 | Matsuda | G01N 15/0205 |
| 2018/0275097 | A1* | 9/2018 | Sandoghdar | G01N 15/1484 |
| 2020/0033245 | A1* | 1/2020 | Corbett | G01N 15/0211 |
| 2020/0096941 | A1* | 3/2020 | Tatsuta | C12M 1/34 |

OTHER PUBLICATIONS

Montfort, FrÃ©dÃ©ric, et al. "Submicrometer optical tomography by multiple-wavelength digital holographic microscopy." Applied optics 45.32 (2006): 8209-8217. (Year: 2006).*

Cheong, Fook Chiong, et al. "Rapid, High-Throughput Tracking of Bacterial Motility in 3D Via Phase-Contrast Holographic Video Microscopy," Biophysical Journal, vol. 108, No. 5, pp. 1248-1256 (2015).

PCT International Search Report corresponding to International Application No. PCT/EP2021/061320, dated Jun. 29, 2021.

EPO Extended European Search Report corresponding to Application No. 20178798.3-1005, dated Oct. 1, 2020.

PCT Written Opinion of the International Searching Authority corresponding to International Application No. PCT/EP2021/061320.

* cited by examiner

METHOD FOR DETERMINING A PROPERTY OF A PARTICLE IN A MEDIUM

CROSS-REFERENCE TO RELATED APPLICATIONS

This application is a National Phase application of International Application No. PCT/EP2021/061320 filed Apr. 29, 2021 which claims priority to the European Patent Application No. 20 178 798.3 filed Jun. 8, 2020, the disclosures of which are incorporated herein by reference.

TECHNICAL FIELD

The present disclosed subject matter relates to a method for determining a property of at least one particle in a medium.

BACKGROUND

The background of the disclosed subject matter lies in the field of observing a property of one or more particles in colloids such as emulsions, cell cultures and bacteria in a medium, for example to study bacterial onset of urinary tract infections. Moreover, plastic particles in ocean water, impurities in liquid foods or pharmaceuticals, cells or their organelles in bodily fluids, or the like could be observed. The property can either be intrinsic to the particle like its size, shape, structure, propulsion mechanism, dry mass, etc. or related to the medium, like the particle's location, velocity or diffusion in the medium, etc. Furthermore, the property of several particles like their distribution, mutual distance, interaction, etc. in the medium can be determined.

It is known to observe, e.g., the distribution or movement of bacteria in a medium by means of digital holographic microscopy. In such methods, a sample containing said bacteria is irradiated with coherent light to obtain an interference image thereof. From this, in turn a three-dimensional model of the bacteria and their distribution in the medium can be computed by applying a reconstruction algorithm onto the interference image, e.g., a forward or back propagation or projection algorithm. However, experiments have shown that the three-dimensional model obtained in this way is often qualitatively unsuited for a detailed analysis due to an inevitable background signal in the interference image. The background signal is induced by a portion of the light that is scattered in the medium, i.e., not by the particles but by other (usually smaller) bodies in the medium (e.g., by Mie-scattering), and impairs a contrast between light scattered by the particles and light not scattered by the particles.

To tackle this impairment, Cheong F. C., et. al. "Rapid, High-Throughput Tracking of Bacterial Motility in 3D via Phase-Contrast Holographic Video Microscopy", Biophysical Journal, Vol. 108, March 2015, pp. 1248-1256, propose to digitally introduce, in the reconstruction algorithm, a phase shift between the light scattered by the medium and light neither scattered by the particles nor by the medium. Thereby, the background signal is reduced and the contrast is enhanced.

Nevertheless, the contrast achieved by current holographic microscopy methods and the related analysis algorithms is sometimes still too low for sufficiently resolving the property of each particle, e.g., its location in the medium. A low contrast leads to wrongly identifying artefacts as particles in the three-dimensional model. This is particularly true in the analysis of samples with a high density of particles and/or with small sized or weakly scattering particles. On the other hand, particles with a high refractive index interact with light in a lens-type manner and, consequently, seem to be located at their focal point instead of their true location and seem to have different size and other properties. This is known as "lens effect". Resolving the true particle property in this case is impossible with the contrasts achieved by current methods of holographic microscopy.

BRIEF SUMMARY

It is an object of the disclosed subject matter to provide a method for determining a property of at least one particle in a medium which allows to obtain a higher contrast, such that the property can be determined more accurately.

This aim is achieved by a method for determining a property of at least one particle in a medium, comprising:
providing a sample of the medium containing said at least one particle;
emitting, with a light source, a coherent light beam to irradiate the sample, wherein a first part of the light beam is scattered by the at least one particle to create a scattered light beam;
recording, with a camera, an interference image of the scattered light beam and a second part of the light beam that has not been scattered by the at least one particle;
computing, with a processor, for each one of a plurality of positions which are three-dimensionally distributed within the sample, an electric field of the first part of the light beam at that position from the interference image;
generating, with the processor, a representation of the sample covering said positions and comprising, for each of said positions, a phase value, determined from the computed electric field and from an estimated electric field of the second part of the light beam both at that position, and an intensity value, determined from the intensity of the first part of the light beam and from the determined phase value both at that position; and
determining, with the processor, said property using the representation.

It shall be noted that the electric field of the light beam is generally complex-valued and, thus, can be described by its real and imaginary parts or by its amplitude and phase. Moreover, the light beam has an intensity, i.e., a power per unit area, which is proportional to the square of the amplitude of the electric field.

Applicants have found out that phase values which, according to the present method, are not determined conventionally from a phase of the scattered light beam only, but are determined both from the light beam scattered by the particles in the medium and from the light beam not scattered by the particles in the medium, yield a higher contrast. The higher contrast is also based on the determination of the intensity values, each of which is determined from the respective phase value and from the intensity of the first part of the light beam. As a consequence thereof, the properties of even weakly scattering or small sized particles or of particles at high density in the medium can be resolved in the representation; moreover artefacts can be—largely—eliminated, and the properties of particles showing a lens effect are discriminated from their focal points, such that the property of the at least one particle in the medium can be determined more accurately.

For computing the electric field of the first part of the light beam, said positions may be distributed within the sample as desired, for example as a regular grid representing, e.g., adjoining cubic regions within the sample or as an irregular grid representing, e.g., arbitrarily formed spatial regions within the sample. However, in a favourable embodiment, said positions lie in virtual planes which are perpendicular to a direction of the second part of the light beam, and said step of computing is executed plane by plane along said direction. Such a distribution of positions allows to efficiently compute the electric field, and to determine the phase and intensity values plane by plane along the beam direction, i.e., in beam direction or in opposite direction. As the planes are perpendicular to the direction of the light beam, the electric field of the second part of the light beam may be estimated to have, at all positions within a respective plane, the same phase.

The interference image carries information about both the first and the second part of the light beam. In order to easily distinguish between the first and second parts of the light beam in the step of computing, it is advantageous when, prior to said step of computing, the interference image is normalised on the basis of a reference image of the coherent light beam without scattering by the at least one particle. The normalised interference image enables a more precise computing of the electric field of the first part and, consequently, a further improved determination of both the phase value and the intensity value and, thus, an enhanced contrast.

Favourably, in said step of generating, the electric field of the second part of the light beam is estimated from a corresponding value of a reference image of the coherent light beam without scattering by the particles. This provides an easy and more accurate estimation of the electric field of the second part of the light beam.

Said reference image may be generated in different ways as known in the art, e.g., as a low pass filtered version of the interference image, by repeating the steps of emitting and recording to obtain several interference images, an average of which is generated as the reference image, etc. Advantageously, the reference image is generated by emitting, with the light source, the coherent light beam without the sample of the medium containing the at least one particle, and recording, with the camera, the reference image thereof. In this variant the reference image is easily generated either with a sample of the medium, wherein the medium contains none of said particle(s), or without a sample, both of which options are comprised by the wording "without the sample of the medium containing the at least one particle".

A particularly high contrast can be achieved, when, in said step of generating, for each of said positions, a minimum difference angle between a phase of said computed electric field and a phase of said estimated electric field is identified, and the phase value is determined as a portion of said difference angle. According to this embodiment, smaller difference angles between said phases can result in even smaller intensity values such that the contrast is further enhanced.

Advantageously, in said step of generating, the phase value is determined as a phase of a weighted sum of said computed electric field and said estimated electric field. Such a determination is simple, computationally cheap and requires only two weights to be determined, the weight of the computed electric field and the weight of the estimated electric field. The weights can, e.g., be determined iteratively or from prior experience to maximise contrast, to suppress the background signal, etc.

In a variant of the previous embodiments, in said step of generating, for each of said positions, the phase value is determined according to $$\xi(r,z) = \arctan 2(\text{Re}(E_1(r,z)+1), \text{Im}(E_1(r,z)+1))$$

with r, z being coordinates of the position, wherein z is a coordinate in the opposite direction to the direction of the second part of the light beam and r denotes a pair of coordinates in a plane perpendicular to said opposite direction, $E_1(r,z)$ being the computed electric field of the first part of the light beam at the position, $\xi(r,z)$ being the phase value at the position, Re, Im denoting the real and imaginary part operators, and arctan 2 denoting the four quadrant inverse tangent function.

In this variant, the electric field of the second part of the light beam is estimated to be real and to have an amplitude of one which is particularly accurate in the embodiment with a normalised interference image. Thereby, the first and second parts of the light beam are weighted equally, such that the intensity values can easily be determined to be smaller at positions where the difference angles between the phases of the computed and estimated electric fields are smaller; as a consequence thereof, the contrast may further be enhanced.

In an embodiment, in said step of generating, for each of said positions, the intensity value is determined according to $$I(r,z) = 2 \cdot I_1(r,z) \cdot (1+\cos(c+\xi(r,z)))$$

with r, z being coordinates of the position, wherein z is a coordinate in the opposite direction to the direction of the second part of the light beam and r denotes a pair of coordinates in a plane perpendicular to said opposite direction, $I_1(r,z)$ being the intensity of the first part of the light beam at the position, $\xi(r,z)$ being the phase value at the position, and $I(r,z)$ being the intensity value at the position.

In this embodiment the intensity value is efficiently calculated. The additional phase shift of $\pi$ further attenuates the background signal such that light scattered by the particles can more easily be distinguished from light not scattered by the particles in the intensity values of the representation.

For an even easier distinction between light scattered by particles and light not scattered by particles, it is favourable when, prior to said step of determining, an intensity threshold is calculated using said intensity values, e.g. as an average of two or more of said intensity values, and when, in said step of determining, for each of said positions, neither the phase value nor the intensity value comprised by the representation for that position are used when the intensity value is smaller than the calculated intensity threshold. Apart from the easier distinction, this allows for a faster determination of the particle distribution due to a reduced amount of data to be considered. In this embodiment, the intensity threshold may be calculated as known to the skilled person, e.g., as a predetermined percentage of a (general, typical, expected, or currently determined) maximum intensity value, as an average of intensity values at several positions, as an overall average of all intensity values of the representation, etc.

In a further embodiment, in said step of emitting, two or more coherent light beams are emitted, wherein said steps of recording, computing and generating are performed for each of the two or more coherent light beams to obtain a respective representation of the sample, and wherein said property is determined using the obtained two or more representations. Thereby, said property can be determined more accurately from the additional information provided by the two or more representations. Moreover, properties like particle velocities, particle diffusion, electrophoresis, etc. can be studied if emissions are time-delayed.

According to an advantageous variant thereof, the two or more representations are averaged to an averaged representation, and, in said step of determining, said property is determined from the averaged representation. By this averaging of several representations, background signals are efficiently attenuated in the averaged representation and, consequently, the determination of said property of the at least one particle in the medium, e.g., a three-dimensional particle distribution, is eased, particularly, when the particles are static.

In another embodiment, in said step of emitting, each of the two or more coherent light beams is emitted with a respective one of two or more light sources. In this case, the sample can be irradiated under different angles which provides additional information, e.g., further easing a distinction of a particle's location which is common to all light beams from the particle's foci each of which is differently located for these light beams. This allows to apply techniques to increase the resolution of the representation, e.g., by multiplexing spatial frequency bands, known in the art as "super-resolution". Moreover, when using a respective light source for each light beam, the coherent light beams can be emitted simultaneously and, thus, easily be correlated.

In the abovementioned embodiments it is beneficial, when, in said step of emitting, each of the two or more coherent light beams is emitted at a different frequency. This allows to obtain a coloured and/or more accurate particle distribution, e.g., by averaging the two or more representations. Moreover, additional information about particles' properties such as their colour, dispersion properties, colour of their secretions, etc. is produced.

In a variant thereof, in said step of emitting, three coherent light beams are emitted, and the respective frequencies of the three coherent light beams correspond to the colours red, green and blue. This exploits the high sensitivity of conventional camera sensors for red, green and blue light (RGB-sensors) and allows to easily obtain a coloured representation. In some cases, also further particle properties, e.g., an oxidation state of the iron in a haemoglobin particle, a colour of a secretion of a particle like a toxin, etc., can be determined by the coloured representation(s).

BRIEF DESCRIPTION OF THE DRAWINGS

The disclosed subject matter shall now be explained in more detail below on the basis of exemplary embodiments thereof with reference to the accompanying drawings, in which.

DETAILED DESCRIPTION

Figure 1:
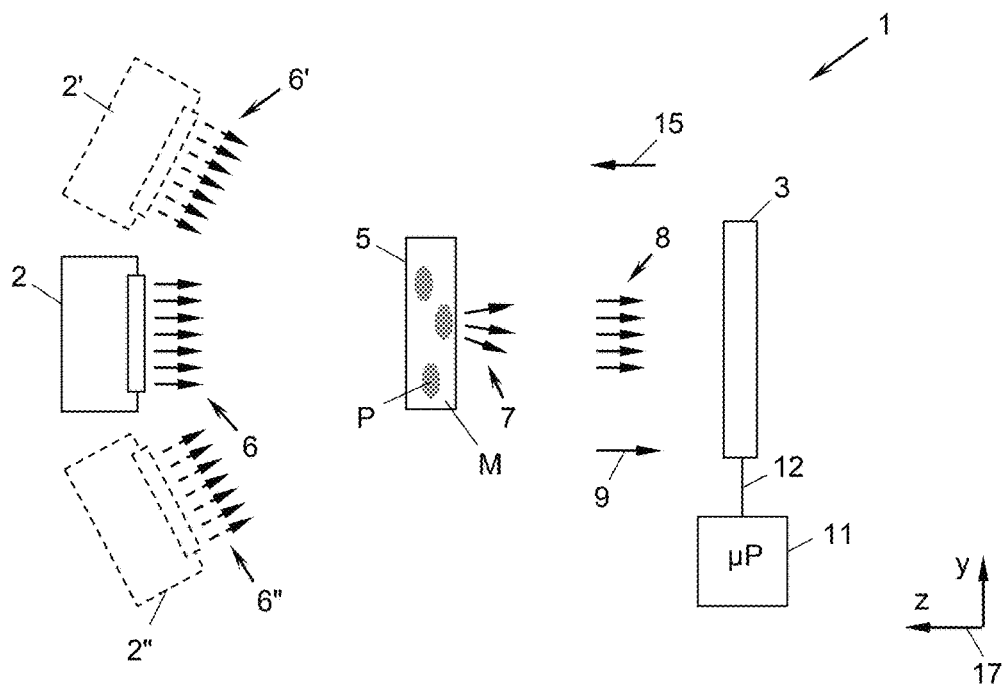
FIG. 1 shows a schematic side view of an inline interferometer used for a method according to the present disclosed subject matter.

FIG. 1 shows an inline interferometer 1 comprising a light source 2 and a camera 3. The inline interferometer 1 is used to determine a property of at least one (microscopic) particle P in a medium M, e.g., one or more particles' location(s), size(s), shape (s), structure(s), elasticity (elasticities), dry mass(es), secretions, velocity (velocities), propulsion mechanism(s), diffusion(s), shape(s) of vesicles and/or several particles' distribution, mutual distances, interaction, etc. In the embodiments shown, a three-dimensional particle distribution 4 (FIG. 2) of particles P in a medium M is determined. For determining the property, a sample 5 of the medium M containing the one or more particles P is provided between the light source 2 and the camera 3. The one or more particles P could be cells, bacteria, charged particles, micro plastics, organelles, etc., and the medium M could be water, oil, a body fluid (e.g. blood), a solution, or the like. Generally, any particle P in any colloid may be analysed.

To this end, the light source 2 emits a coherent light beam 6 to irradiate the provided sample 5. The light source 2 may be of any type that is capable of emitting a coherent light beam 6, for example a laser diode.

In the sample 5, a first part of the light beam 6 is scattered by the one or more particles P and, thereby, creates a scattered light beam 7. However, a second part of the light beam 6 is not scattered by the particles P and traverses the sample 5 as an unscattered light beam 8 in a beam direction 9. In the context of the present description, the scattered light beam 7 relates to scattering by the one or more particles P in the medium M whereas the unscattered light beam 8 has not been scattered by the particles P in the medium M. Furthermore, scattering can mean diffracting, refracting, or reflecting, and depends on the choice of interferometer 1 used, which in turn may depend on the nature of the particles P, e.g., their transparency, reflectivity, or refractivity, and of the medium M.

The scattered light beam 7 and the unscattered light beam 8 interfere with each other. At the end of the path of the light beam 6, the camera 3 records an interference image 10 (FIG. 2) of the scattered light beam 7 and the unscattered light beam 8. The camera 3 can, for the present purpose, be any analogue or digital camera, for example with a Complementary Metal-Oxide Semiconductor (CMOS) or a Charge Coupled Device (CCD) image sensor.

It shall be noted, that a portion of both said scattered light beam 7 and said unscattered light beam 8 may, however, also be scattered in the medium M, e.g., by other (usually smaller) bodies (e.g. via the Tyndall Effect), and that this portion of the unscattered light beam 8 slightly deviates from the beam direction 9. In the interference image 10, said portions of the scattered and unscattered light beams 7, 8 result in an inevitable, though undesirable background signal that generally impairs the determination of the particle distribution 4 in the medium M.

The interferometer 1 may comprise one or more further optical devices as known in the art of holographic microscopy, e.g., an attenuator ring to improve the signal to noise ratio, a microscope objective, a phase plate, one or more lenses (e.g., a diverging lens to magnify the interference image 10), or the like. Moreover, the interferometer 1 can also be embodied as another type of interferometer than an inline interferometer, for example as an interferometer 1 utilizing beam-splitters.

The interference image 10 recorded by the camera 3 is then forwarded to a processor 11 via an interface 12. The processor 11 processes the interference image 10 to obtain the property of the at least one particle P in the medium M (here: the three-dimensional particle distribution 4) therefrom as shall now be explained with reference to FIGS. 2-5.

While the camera 3 records the interference image 10 (in the example of FIG. 2: based on an *E. coli* bacterium in Lysogeny broth) as a purely two-dimensional image, this interference image 10 encodes both intensity and phase information of the light beam 6. This information allows the processor 11 to "reconstruct" the sample 5 of the medium M containing the particles P in three steps $S_1$-$S_3$.

Figure 2:
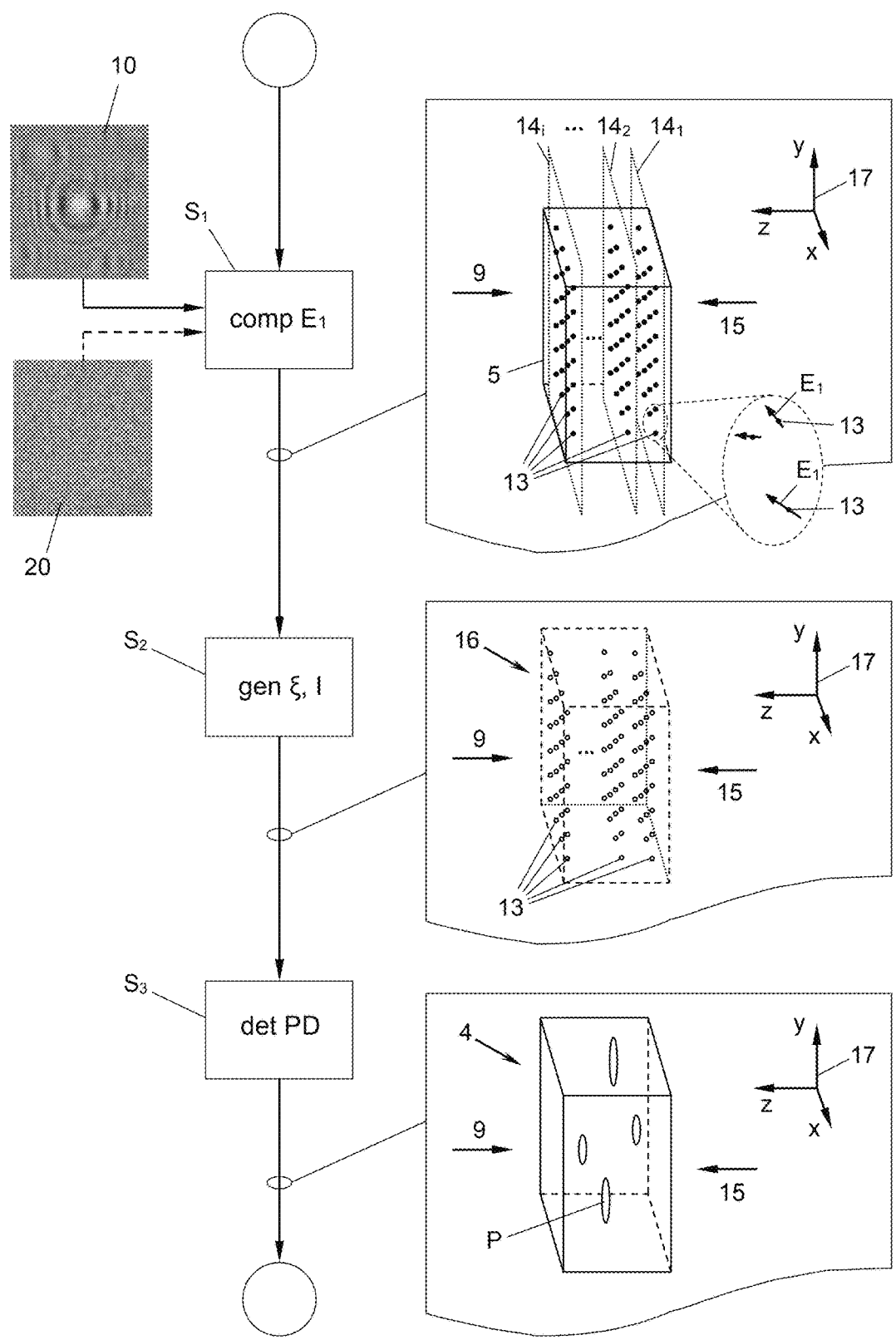
FIG. 2 shows a determination of a three-dimensional particle distribution according to the disclosed subject matter from an interference image generated by the interferometer of FIG. 1 in a flow chart.

In a first step $S_1$, the processor 11 computes an electric field $E_1$ of the first part of the light beam 6, i.e., of the scattered light beam 7, for each of a plurality of positions 13 from the interference image 10. The positions 13 are three-dimensionally distributed within the sample 5. In the example of FIG. 2, the positions 13 lie in several virtual planes $14_1$, $14_2$, ..., generally $14_i$, which are perpendicular to the beam direction 9 of the unscattered light beam 8. In this example, the positions 13 are identically arranged in each virtual plane $14_i$; however, this is optional. In other examples, the positions 13 may be three-dimensionally distributed within the sample 5, e.g., in a regular grid arrangement representing adjoining cubic regions or in an irregular grid arrangement representing adjacent arbitrarily formed spatial regions.

To compute the electric field $E_1$ of the scattered light beam 7, for each position 13, the processor 11 applies a reconstruction algorithm onto the interference image 10. The electric field $E_1$ of the scattered light beam 7 for each position 13 is complex-valued and, thus, its real and imaginary parts or its phase (pi and amplitude, respectively, are computed. In the present example, the processor 11 applies the reconstruction algorithm plane by plane in a direction 15 which is opposite to the beam direction 9. However, this is optional and other reconstruction algorithms may be applied. Multiple variants of such reconstruction algorithms are known in the art, for example forward or back propagation or projection algorithms, e.g., an inverse Radon transformation, a Fourier-domain reconstruction algorithm, an iterative reconstruction algorithm, etc.

Figure 3:
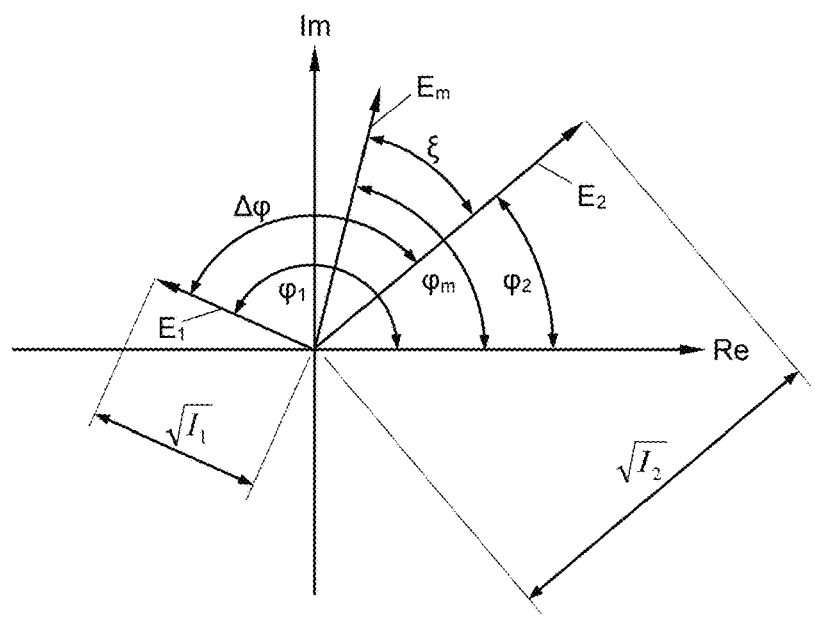
FIG. 3 shows a determination of a phase value in accordance with the determination of FIG. 2 in a complex plane.
Figure 4:
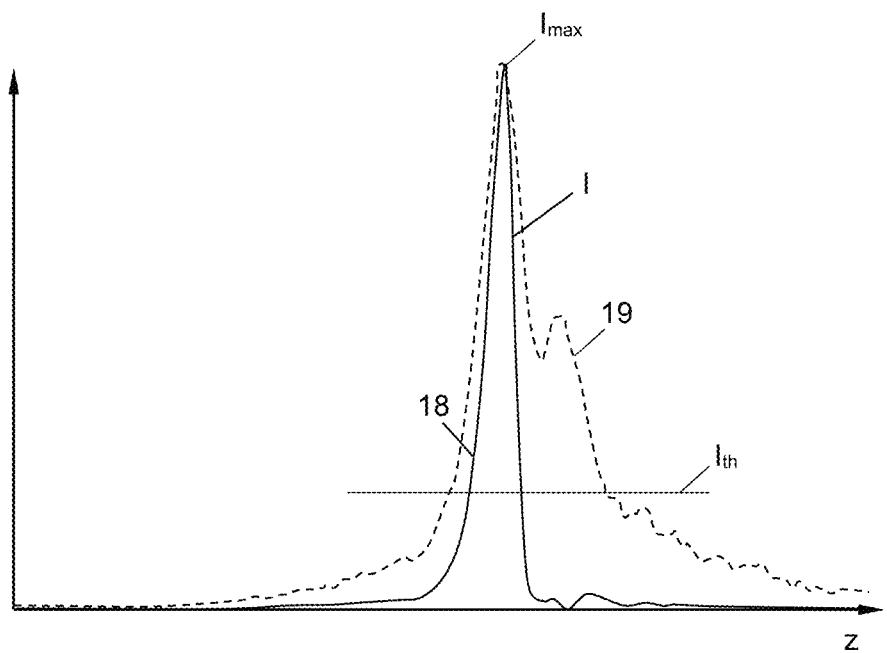
FIGS. 4 and 5 show an intensity of a light in a sample of a medium as a graph over an opposite direction to a direction of the light beam (FIG. 4) and over a direction perpendicular to the light beam (FIG. 5), respectively.
Figure 5:
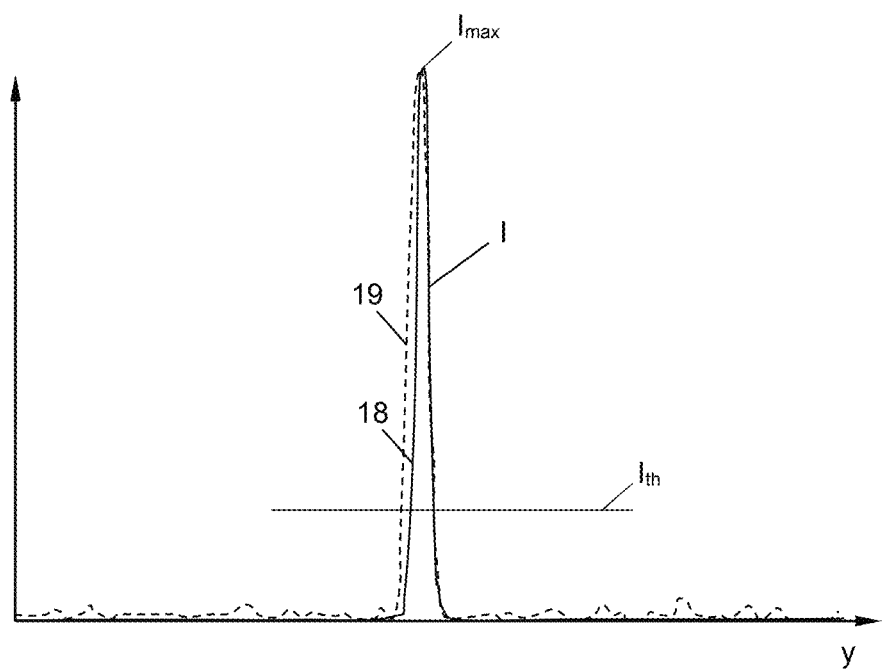

In a subsequent second step $S_2$, the processor 11 generates a representation 16 of the sample 5 which covers all positions 13 and comprises, for each position 13, a respective phase value $\xi$ ((FIG. 3) and a respective intensity value I (FIGS. 4 and 5). The phase value $\xi$ represents a phase shift of the scattered light beam 7, which phase shift is induced by a scattering by the particles P only. For each position 13 the phase value $\xi$ is determined from the electric field $E_1$ of the scattered light beam 7 at that position 13 and from an estimated electric field $E_2$ of the unscattered light beam 8 at that position 13. To this end, the electric field $E_2$ of the unscattered light beam 8 may be estimated as known in the art, i.a., from a measurement, as will be exemplified in detail further down. The intensity value I represents an intensity of the light beam 6. For each position 13, the intensity value I is determined from the intensity $I_1$ of the scattered light beam 7 computed for that position 13, e.g., as a square of the amplitude of the electric field $E_1$, and from the phase value $\xi$ determined for that position 13.

Subsequent to step $S_2$, in a third step $S_3$, the processor 11 determines the property of the at least one particle P in the medium M (here: the particle distribution 4) using the representation 16 of the sample 5 obtained in step $S_2$. This is done by evaluating the determined intensity values I and/or the phase values $\xi$ as known in the art. For instance, the intensity and/or phase values I, $\xi$ and the respective positions 13, i.e., their three-dimensional coordinates in a given coordinate system 17, may be input to a pattern recognition algorithm, a neural network, etc.

In an embodiment, said property of the at least one particle P in the medium M (here: the particle distribution 4) may be determined with the processor 11 (in this embodiment: with the aid of the processor 11), e.g., by human inspection of a visualisation of the intensity values I of the representation 16, which visualisation is provided by the processor 11.

Returning to step $S_2$ of generating the representation 16, both the phase value $\xi$ and the intensity value I at each position 13 can be determined in different ways, as follows.

In the exemplary embodiment of FIG. 3, a minimum difference angle $\Delta\varphi$ between the phase $\varphi_1$ of the computed electric field $E_1$ and a phase $\varphi_2$ of the estimated electric field $E_2$ is identified, i.e., that one of the two difference angles that is smaller than r. Then, the phase value $\xi$ is determined as a portion of said difference angle $\Delta\varphi$. This can be achieved in a variety of ways; for example, the phase value $\xi$ may be determined as a predetermined portion, e.g., a half, of the identified minimum difference angle $\Delta\varphi$. It shall be understood that, when the phase $\varphi_2$ of the unscattered light beam 8 is estimated to be zero (which is usually the case by definition), the difference angle $\Delta\varphi$ and the computed phase $\varphi_1$ of the scattered light beam 7 coincide. In another example, the electric fields $E_1$ and $E_2$ at each position 13 are blended to obtain a blended field $E_m$ a phase $\varphi_m$ of which lies between the phases $\varphi_1$ and $\varphi_2$ of the computed and estimated electric fields $E_1$ and $E_2$. In yet another example, the phase value $\xi$ is determined as a difference of the phase $\varphi_m$ of the blended field $E_m$ and one of said phases $\varphi_1$ and $\varphi_2$. In particular, the electric field $E_2$ may be estimated to be real and to have an amplitude of one, in which case the phase value $\xi$ may be determined according to $$\xi(r,z)=\arctan 2(\text{Re}(E_1(r,z)+1),\text{In}(E_1(r,z)+1)) \quad \text{(equation 1)}$$

with
r, z being coordinates of the position 13, wherein z is a coordinate in an opposite direction 15 to a direction 9 of the second part of the light beam 6 and r denotes a pair of coordinates in a plane x, y perpendicular to said opposite direction 15,
$E_1(r,z)$ being the computed electric field of the first part of the light beam 6 at the position 13,
$\xi(r,z)$ being the phase value at the position 13,
Re, Im denoting the real and imaginary part operators, and
arctan 2 denoting the four quadrant inverse tangent function.

In another embodiment, in said step $S_2$ of generating, the phase value $\xi$ is determined as a phase of a weighted sum of the computed electric field $E_1$ and the estimated electric field $E_2$. In this embodiment, the weights are, e.g., determined from known optical parameters of the particles P and/or the medium M, from iteratively maximising a contrast between high intensity values I and low intensity values I in the resulting representation 16, etc.

The graphs in FIGS. 4 and 5 show the intensity value I determined along the direction 15, i.e., along the z-axis of the coordinate system 17 (FIG. 4), and in a perpendicular direction thereto (here: along the y-axis of the coordinate system 17, FIG. 5). Therein, solid lines 18 depict the intensity value I determined according to $$I(r,z)=2 \cdot I_1(r,z) \cdot (1+\cos(\pi+\xi(r,z))) \quad \text{(equation 2)}$$

with
r, z being coordinates of the position 13, wherein z is a coordinate in an opposite direction 15 to a direction 9 of the second part of the light beam 6 and r denotes a pair of coordinates in a plane x, y perpendicular to said opposite direction 15, $I_1(r,z)$ being an intensity of the first part of the light beam 6 at the position 13, $\xi(r,z)$ being the phase value at the position 13, and $I(r,z)$ being the intensity value at the position 13.

In FIGS. 4 and 5, dashed lines 19 depict an intensity value I determined according to the state of the art (here: based on an interference image recorded of a silica particle in "Milli Q" deionised water). As can be seen in FIGS. 4 and 5, the solid lines 18 are narrower about a respective maximum intensity $I_{max}$ and overall show less fluctuations.

Alternatively, in a more general embodiment, an additional phase shift θ between said portion of the light beams 7, 8 scattered by the medium and the unscattered light beam 8 may be introduced and fitted, modelled, simulated, iterated, etc., to maximise a contrast between high intensity values I and low intensity values I in the representation 16. In this case, the intensity value I is, e.g., determined according to $$I(r,z)=2 \cdot I_1(r,z) \cdot (1+\cos(\Theta+\xi(r,z))).\qquad\text{(equation 3)}$$

In an optional embodiment, an intensity threshold $I_{th}$ is introduced prior to the processor's step $S_3$. This intensity threshold $I_{th}$ is calculated using the intensity values I of the representation 16. Thereupon, the intensity values I and the phase values ξ for those positions 13 at which the determined intensity value I is smaller than the calculated intensity threshold $I_{th}$ shall not be used in step $S_3$, e.g., not be input to the pattern recognition algorithm. The intensity threshold $I_{th}$ may, e.g., be a percentage of a maximum intensity value $I_{max}$ (FIGS. 4 and 5), a running average, an average of two or more, or even of all intensity values I comprised in the representation 16. Similarly, a phase threshold may optionally be calculated for the same purpose and be used the same way as the intensity threshold $I_{th}$.

In a further optional embodiment, a reference image 20 of the coherent light beam 6 which has not been scattered by the at least one particle P, thus relating to the unscattered light beam 8, is generated. The reference image 20 may be generated in different ways known to the skilled person, e.g., as a low-pass filtered interference image 10. In one variant the reference image 20 is generated by emitting, with the light source 2, the coherent light beam 6 without the sample 5 of the medium M containing said at least one particle P, and recording, with the camera 3, the reference image 20 thereof. The wording "without the sample 5 of the medium M containing the particles P" either refers to no sample 5 at all or to a different sample comprising the medium M without the particles P being provided between the light source 2 and the camera 3 of the interferometer 1.

On the basis of the reference image 20, the processor 11 may normalise the interference image 10 prior to said step $S_1$ of computing as known in the art. This results in computing a normalised computed electric field $E_1$ in step $S_1$ that is used as the electric field $E_1$ in subsequent step $S_2$.

The electric field $E_2$ of the unscattered light beam 8 may be estimated from a corresponding value, e.g., from an intensity of the reference image 20 in step $S_2$. In the example of FIG. 3, the amplitude of the electric field $E_2$ of the unscattered light beam 8 is calculated as the square-root of an intensity $I_2$ of the unscattered light beam 8 estimated, e.g., from a corresponding intensity of the reference image 20. Moreover, the phase $\varphi_2$ of this electric field $E_2$ is estimated, e.g., to be zero, by simulating the light beam 8, by forward or back propagating the reference image 20, and/or by iterating step $S_2$ and/or step $S_3$ for several phases $\varphi_2$ to maximise a contrast in the representation 16 or to achieve known particle sizes in the particle distribution 4.

In the embodiments described above, the steps $S_1$-$S_3$ were performed on a single recorded interference image 10. The method is, however, not limited to these embodiments.

In a further embodiment, several interference images 10 are recorded, each on the basis of a respective coherent light beam 6 emitted from the light source 2. Each of these interference images 10 may optionally be normalised, either all by a common or each by a separate reference image 20. The common reference image 20 could in this case be generated by averaging these recorded interference images 10.

Subsequently, for each of said interference images 10, an electric field $E_1$ of the respective scattered light beam 7 is computed in step $S_1$ and a respective representation 16 of the sample 5 is generated in step $S_2$. These representations 16 obtained by performing the steps of recording, computing $S_1$ and generating $S_2$ for each light beam 6 can then be used to determine the property of the at least one particle P in the medium M; to this end, these representations 16 may, optionally, be averaged to an averaged representation comprising averaged intensity and phase values which are used in step $S_3$ to determine, e.g., the three-dimensional particle distribution 4 as described above. The averaged intensity and phase values may be averaged as known in the art, e.g., as a geometric average, an arithmetic average, etc. Alternatively, step $S_3$ can be performed for each of the representations 16 separately to determine a change of the property of one or more particles P over time, e.g., several particle distributions 4 to study the movement of one or more particles P in the medium M.

Returning to the example of FIG. 1, the interferometer 1 may optionally comprise (here: two) additional light sources 2', 2". Each light source 2, 2', 2" emits a respective coherent light beam 6, 6', 6" at the same or at a different frequency to irradiate the sample 5. The coherent light beams 6, 6', 6" are emitted simultaneously or one after the other and are scattered by the at least one particle P. Respective interference images 10 are recorded, one for each light beam 6, 6', 6", either with the one camera 3 or with several cameras.

In an optional embodiment of this example, the three frequencies of the light beams 6, 6' and 6" correspond to the colours red, green and blue; however, other frequencies may be chosen, even frequencies of light not visible to the human eye.

Subsequently, steps $S_1$-$S_3$ are performed for each of the light beams 6, 6', 6" in the processor 11 as described above, wherein in step $S_3$, e.g., a coloured particle distribution 4 may be determined. Moreover, an averaged representation 16 may optionally be calculated as detailed above. Therefrom the property of the at least one particle P (here: the particle distribution 4) may be determined.

Depending on the locations of the light sources 2, 2', 2" and optional optical devices in the interferometer 1, a different set of spatial frequencies may be recorded with the camera(s), when desired. In this case, an averaged representation 16 resulting therefrom comprises more information about each position 13 and, hence, has a higher resolution (known in the art as "super resolution").

Moreover, the coherent light beams 6, 6', 6" may irradiate the sample 5 under different angles which may be considered, e.g., by applying a respective forward or backward propagation along each beam direction to the interference images respectively obtained therefrom. In an alternative variant thereof, instead of using several light sources 2, 2',

2", only the light source 2 may emit several coherent light beams 6 at different frequencies, which are recorded and processed as described above.

The disclosed subject matter is not restricted to the specific embodiments described above but encompasses all variants, modifications and combinations thereof that fall within the scope of the appended claims.

The invention claimed is:
1. A method for determining a property of at least one particle in a medium, comprising:
providing a sample of the medium containing said at least one particle;
emitting, with a light source, a coherent light beam to irradiate the sample, wherein a first part of the light beam is scattered by the at least one particle to create a scattered light beam;
recording, with a camera, an interference image of the scattered light beam and a second part of the light beam that has not been scattered by the at least one particle;
computing, with a processor, for each one of a plurality of positions which are three-dimensionally distributed within the sample, an electric field of the first part of the light beam at that position from the interference image:
generating, with the processor, a representation of the sample covering said positions and comprising, for each of said positions, a phase value which is determined from and depending on the computed electric field and an estimated electric field of the second part of the light beam both at that position, and an intensity value determined from an intensity of the first part of the light beam and from the determined phase value both at that position; and
determining, with the processor, said property using the representation.

2. The method according to claim 1, wherein said positions lie in virtual planes which are perpendicular to a direction of the second part of the light beam, and wherein said step of computing is executed plane by plane along said direction.

3. The method according to claim 1, wherein, prior to said step of computing, the interference image is normalised on the basis of a reference image of the coherent light beam without scattering by the at least one particle.

4. The method according to claim 3, wherein the reference image is generated by emitting, with the light source, the coherent light beam without the sample of the medium containing the at least one particle, and recording, with the camera, the reference image of the sample without containing the at least one particle.

5. The method according to claim 1, wherein, in said step of generating, an electric field of the second part of the light beam is estimated from a corresponding value of a reference image of the coherent light beam without scattering by the at least one particle.

6. The method according to claim 1, wherein, in said step of generating, the phase value is determined as a phase of a weighted sum of said computed electric field and said estimated electric field.

7. The method according to claim 1, wherein, prior to said step of determining, an intensity threshold is calculated using said intensity values and wherein, in said step of determining, for each of said positions, neither the phase value nor the intensity value comprised by the representation for that position are used when the intensity value is smaller than the calculated intensity threshold.

8. The method according to claim 7, wherein said intensity threshold is calculated as an average of two or more of said intensity values.

9. The method according to claim 1, wherein, in said step of generating, for each of said positions, the intensity value is determined according to $$I(r,z)=2 \cdot I_1(r,z) \cdot (1+\cos(\pi+\xi(r,z)))$$

with r, z being coordinates of the position, wherein z is a coordinate in an opposite direction to a direction of the second part of the light beam and r denotes a pair of coordinates in a plane perpendicular to said opposite direction, $I_1(r,z)$ an intensity of the first part of the light beam at the position, $\xi(r,z)$ the phase value at the position, and $I(r,z)$ the intensity value at the position.

10. The method according to claim 1, wherein, in said step of emitting, two or more coherent light beams are emitted, wherein said steps of recording, computing and generating are performed for each of the two or more coherent light beams to obtain a respective representation of the sample, and wherein said property is determined using the obtained two or more representations.

11. The method according to claim 10, wherein the two or more representations are averaged to an averaged representation comprising averaged intensity values and averaged phase values, and wherein, in said step of determining, said property is determined from the averaged representation.

12. The method according to claim 10, wherein, in said step of emitting, each of the two or more coherent light beams is emitted with a respective one of two or more light sources irradiating the sample under different angles.

13. The method according to claim 10, wherein, in said step of emitting, each of the two or more coherent light beams is emitted at a different frequency.

14. The method according to claim 13, wherein, in said step of emitting, three coherent light beams are emitted, and wherein the respective frequencies of the three coherent light beams correspond to the colours red, green and blue.

15. A method for determining a property of at least one particle in a medium, comprising:
providing a sample of the medium containing said at least one particle;
emitting, with a light source, a coherent light beam to irradiate the sample, wherein a first part of the light beam is scattered by the at least one particle to create a scattered light beam;
recording, with a camera, an interference image of the scattered light beam and a second part of the light beam that has not been scattered by the at least one particle;
computing, with a processor, for each one of a plurality of positions which are three-dimensionally distributed within the sample, an electric field of the first part of the light beam at that position from the interference image;
generating, with the processor, a representation of the sample covering said positions and comprising, for each of said positions, a phase value determined from the computed electric field and from an estimated electric field of the second part of the light beam both at that position, and an intensity value determined from an intensity of the first part of the light beam and from the determined phase value both at that position; and
determining, with the processor, said property using the representation, wherein, in said step of generating, for each of said positions, a minimum difference angle between a phase of said computed electric field and a phase of said estimated electric field is identified, and the phase value is determined as a portion of said difference angle, the portion being smaller than said difference angle.

16. A method for determining a property of at least one particle in a medium, comprising:
providing a sample of the medium containing said at least one particle;
emitting, with a light source, a coherent light beam to irradiate the sample, wherein a first part of the light beam is scattered by the at least one particle to create a scattered light beam;
recording, with a camera, an interference image of the scattered light beam and a second part of the light beam that has not been scattered by the at least one particle;
computing, with a processor, for each one of a plurality of positions which are three-dimensionally distributed within the sample, an electric field of the first part of the light beam at that position from the interference image;
generating, with the processor, a representation of the sample covering said positions and comprising, for each of said positions, a phase value determined from the computed electric field and from an estimated electric field of the second part of the light beam both at that position, and an intensity value determined from an intensity of the first part of the light beam and from the determined phase value both at that position; and
determining, with the processor, said property using the representation,
wherein, in said step of generating, for each of said positions, a minimum difference angle between a phase of said computed electric field and a phase of said estimated electric field is identified, and the phase value is determined as a portion of said difference angle, and
wherein, in said step of generating, for each of said positions the phase value is determined according to $$\xi(r,z) = \arctan 2(\text{Re}(E_1(r,z)+1), \text{Im}(E_1(r,z)+1))$$

with
r, z being coordinates of the position, wherein z is a coordinate in an opposite direction to a direction of the second part of the light beam and r denotes a pair of coordinates in a plane x, y perpendicular to said opposite direction,
$E_1(r,z)$ being the computed electric field of the first part of the light beam at the position,
$\xi(r,z)$ being the phase value at the position, and
arctan 2 denoting a four quadrant inverse tangent function.

17. The method according to claim 16, wherein, prior to said step of computing, the interference image is normalised on the basis of a reference image of the coherent light beam without scattering by the at least one particle.

18. The method according to claim 17, wherein the reference image is generated by emitting, with the light source, the coherent light beam without the sample of the medium containing the at least one particle, and recording, with the camera, the reference image of the sample without containing the at least one particle.

19. The method according to claim 16, wherein, in said step of generating, for each of said positions, the intensity value is determined according to $$I(r,z) = 2 \cdot I_1(r,z) \cdot (1+\cos(\pi+\xi(r,z)))$$

with
r, z being coordinates of the position, wherein z is a coordinate in an opposite direction to a direction of the second part of the light beam and r denotes a pair of coordinates in a plane perpendicular to said opposite direction,
$I_1(r,z)$ an intensity of the first part of the light beam at the position,
$\xi(r,z)$ the phase value at the position, and
$I(r,z)$ the intensity value at the position.

20. The method according to claim 16, wherein, in said step of emitting, two or more coherent light beams are emitted, wherein said steps of recording, computing and generating are performed for each of the two or more coherent light beams to obtain a respective representation of the sample, and wherein said property is determined using the obtained two or more representations.

* * * * *

UNITED STATES PATENT AND TRADEMARK OFFICE
CERTIFICATE OF CORRECTION

PATENT NO. : 12,326,392 B2
APPLICATION NO. : 17/925508
DATED : June 10, 2025
INVENTOR(S) : Van Oostrum et al.

Page 1 of 1

It is certified that error appears in the above-identified patent and that said Letters Patent is hereby corrected as shown below:

In the Specification

Column 3, Line 66:
Now reads: "$\xi(r,z) = \arctan 2(Re(E_1(r,z) + 1), Im(E_1(r,z) +1))$"
Should read: -- $\xi(r,z) = \arctan2(Re(E_1(r,z)+ 1), Im(E_1(r,z)+1))$ --

Column 4, Line 10:
Now reads: "arctan 2 denoting"
Should read: -- arctan2 denoting --

Column 8, Line 35:
Now reads: "$\xi(r,z) = \arctan 2(Re(E_1(r,z) + 1), In(E_1(r,z) +1))$"
Should read: -- $\xi(r,z) = \arctan2(Re(E_1(r,z) + 1), Im(E_1(r,z) +1))$ --

Column 11, Line 25:
Now reads: "from the interference image:"
Should read: -- from the interference image; --

In the Claims

Claim 16, Column 13, Line 38:
Now reads: "$\xi(r,z) = \arctan 2(Re(E_1(r,z)+1), Im(E_1(r,z)+1))$"
Should read: -- $\xi(r,z) = \arctan2(Re(E_1(r,z)+1), Im(E_1(r,z)+1))$ --

Claim 16, Column 14, Line 7:
Now reads: "arctan 2 denoting"
Should read: -- arctan2 denoting --

Signed and Sealed this
Nineteenth Day of August, 2025

Coke Morgan Stewart
*Acting Director of the United States Patent and Trademark Office*